(12) United States Patent
Wissemborski et al.

(10) Patent No.: US 9,061,221 B2
(45) Date of Patent: Jun. 23, 2015

(54) PHOSPHATE RECOVERY FROM SLUDGE

(75) Inventors: Rüdiger Wissemborski, Gau-Algesheim (DE); Rainer Schnee, Mainz (DE); Rainer Wallwitz, Niedernhausen (DE); David Kümmet, Budenheim (DE)

(73) Assignee: CHEMISCHE FABRIK BUDENHEIM KG, Budenheim (DE)

( * ) Notice: Subject to any disclaimer, the term of this patent is extended or adjusted under 35 U.S.C. 154(b) by 0 days.

(21) Appl. No.: 13/318,228

(22) PCT Filed: Apr. 30, 2010

(86) PCT No.: PCT/EP2010/055936
§ 371 (c)(1),
(2), (4) Date: Nov. 23, 2011

(87) PCT Pub. No.: WO2010/130589
PCT Pub. Date: Nov. 18, 2010

(65) Prior Publication Data
US 2012/0070360 A1 Mar. 22, 2012

(30) Foreign Application Priority Data
May 11, 2009 (DE) .......................... 10 2009 020 745

(51) Int. Cl.
| | | |
|---|---|---|
| *C01B 25/26* | (2006.01) | |
| *C05B 15/00* | (2006.01) | |
| *C05F 7/00* | (2006.01) | |
| *C02F 1/52* | (2006.01) | |
| *B01D 11/04* | (2006.01) | |
| *B01D 11/02* | (2006.01) | |
| *C02F 1/26* | (2006.01) | |
| *C02F 11/00* | (2006.01) | |
| *C05D 3/00* | (2006.01) | |

(52) U.S. Cl.
CPC ........... B01D 11/0407 (2013.01); *C02F 1/5236* (2013.01); B01D 11/04 (2013.01); *C01B 25/26* (2013.01); B01D 11/0203 (2013.01); *C02F 1/26* (2013.01); *C02F 11/002* (2013.01); *C05B 15/00* (2013.01); *C05D 3/00* (2013.01); *C05F 7/00* (2013.01); *Y02E 50/343* (2013.01)

(58) Field of Classification Search
CPC .................. C01B 25/12; C01B 25/26–25/468; B01D 11/02; B01D 11/04–11/0411; C05B 15/00; C05F 7/00; C02F 1/5236
USPC ............................ 423/157.5, 299, 304–321.2; 210/703–707, 710–713, 749–752, 210/767–771, 906, 907, 634, 639, 702, 774, 210/787, 804, 806, 748.07; 71/10–13, 71/32–53, 64.08; 241/19–21, 24, 25
See application file for complete search history.

(56) References Cited

U.S. PATENT DOCUMENTS

| | | | | |
|---|---|---|---|---|
| 3,947,350 | A * | 3/1976 | Cardinal, Jr. .................. | 210/711 |
| 4,076,620 | A * | 2/1978 | Opferkuch et al. ........... | 210/711 |
| 4,225,565 | A * | 9/1980 | Marukawa et al. ........... | 423/208 |
| 5,135,655 | A * | 8/1992 | Cimino et al. ................ | 210/639 |
| 6,287,471 | B1 * | 9/2001 | De Rigaud .................... | 210/724 |
| 6,966,941 | B1 | 11/2005 | Grobler et al. | |
| 2005/0109713 | A1 * | 5/2005 | Shepherd et al. ............. | 210/769 |
| 2005/0112735 | A1 * | 5/2005 | Zappi et al. ................... | 435/134 |
| 2006/0000769 | A1 * | 1/2006 | Miklos .......................... | 210/605 |
| 2008/0134837 | A1 | 6/2008 | Wai et al. | |

FOREIGN PATENT DOCUMENTS

| | | |
|---|---|---|
| CH | 633 498 | 12/1982 |
| DE | 1 060 549 | 7/1959 |
| DE | 29 02 914 | 8/1979 |
| DE | 102 06 347 | 9/2003 |
| JP | 57-111215 | 7/1982 |
| JP | H08-040711 | 2/1996 |
| JP | 2007-070217 A | 3/2007 |

OTHER PUBLICATIONS

Valve, "Nitrogen Removal from Municipal Wastewater," 1995, Nordic Council of Ministers, pp. 110-122.*
Notification of Transmittal of Translation of the International Preliminary Report on Patentability, International Preliminary Report on Patentability issued Nov. 22, 2011, and Translation of the Written Opinion of the International Search Authority.
International Search Report mailed Aug. 26, 2010 in PCT/EP2010/055936 filed Apr. 30, 2010.
German Search Report mailed Feb. 3, 2010 in DE 10 2009 020 745.7 filed May 11, 2009.

* cited by examiner

*Primary Examiner* — Anthony J Zimmer
*Assistant Examiner* — Justin Bova
(74) *Attorney, Agent, or Firm* — Drinker Biddle & Reath LLP

(57) ABSTRACT

A process for recovering reusable materials, in particular phosphate, from sewage sludge products, namely sewage sludge, sewage sludge ash or sewage sludge slag, by extraction, in which a suspension of the sewage sludge product is produced in water, alcohol, water-alcohol mixture or an aqueous solution, gaseous carbon dioxide ($CO_2$) or supercritical carbon dioxide ($scCO_2$) is introduced as an extraction agent into the suspension of the sewage sludge product, undissolved solids are separated from the liquid suspension agent, carbon dioxide is removed from the suspension agent, and reusable materials dissolved in the suspension agent are precipitated and separated from the suspension agent.

20 Claims, No Drawings

PHOSPHATE RECOVERY FROM SLUDGE

CROSS REFERENCE TO RELATED APPLICATIONS

This application is the National Stage of International Application No. PCT/EP2010/055936, filed Apr. 30, 2010, and claims benefit of German Application No. 10 2009 020 745.7, filed May 11, 2009, both of which are herein incorporated by reference in their entirety.

The invention concerns the recovery of reusable materials, in particular phosphate, from sewage sludge products, namely sewage sludge, sewage slush ash or sewage slush slag, by extraction.

BACKGROUND OF THE INVENTION

Sewage sludge from waste water treatment represents both a pollutant sink and also a storage means for nutrients such as nitrogen, phosphorus and potassium. There are therefore many different attempts at and methods of utilising sewage sludge as a valuable source of raw materials ('secondary raw materials'). For example there are a series of methods of processing sewage sludge in order to be able to recycle it in agriculture as a phosphate fertiliser. On the other hand because of its high heavy metal and toxic substance loading sewage sludge is also viewed as critical as a fertiliser and is even treated as special waste. In some countries therefore agricultural sewage sludge exploitation is already limited or entirely stopped.

With that background in mind the recovery of reusable materials from the sewage sludge is of ever increasing significance in comparison with pure sewage sludge treatment and decontamination for further use. That concerns in particular the reusable material phosphorus, for which worldwide there is a high demand with at the same time limited availability. Phosphate is predominantly mined in the USA, China, Morocco and Russia. There are estimates that the phosphorus reserves which can be mined at reasonable cost and effort are sufficient only for between 60 and 130 years more. In that respect it is to be noted that it becomes increasingly difficult and also costly to acquire high-quality phosphorus ores which are only slightly contaminated with heavy metals.

Against the background of the limited worldwide reserves of phosphorus, to which it is possible to have recourse with present day mining conditions, and the rising price of raw phosphates and the prognoses about a consumption which is increasing having regard to the growth in population and future eating habits, new measures for obtaining and recovering phosphorus from other sources such as for example from the water or sewage sludge or sewage sludge ash are being increasingly discussed.

In the monoincineration of sewage sludge phosphorus remains as a residue in the ash. Depending on the mode of operation of the sewage treatment plant the concentration is between 4 and 8% by weight of P, or between 10 and 22% by weight of phosphorus pentoxide ($P_2O_5$). Further main components of the sewage sludge ash are $SiO_2$ (30-50%), CaO (about 10-20%) and $Al_2O_3$ and $Fe_2O_3$.

Calcium is predominantly incorporated with the hardness of water. The silicon oxide originates from the incorporated solid materials such as sand, gravel and so forth. Aluminum compounds are in part incorporated by way of the water-softening zeolites contained in the washing agent.

In addition the sewage sludge ash contains heavy metals, inter alia Cr (50 ppm), Cu (350 ppm), Ni (30 ppm), Pb (10.0 ppm), Cd (1.3 ppm) and Hg (1.45 ppm). Organic toxic substances are generally destroyed without any residues by incineration of the sewage sludge and germs and odiferous substances are eliminated by incineration.

Various approaches are known in the state of the art for utilising or obtaining phosphorus from the ash from sewage sludge monoincineration processes.

1. Directly Applying the Ash to Agricultural Surfaces

That may be acceptable only when the heavy metal contents are very low and it can be demonstrated that the phosphorus is present in a plant-available form.

2. Direct Processing of the Ash in the Fertiliser Industry

This procedure may also be adopted only with a low level of heavy metal contamination as both quite a few heavy metals and also iron compounds cause problems in the processes used in phosphorus ore processing.

3. Washing out the Phosphates with Hot Water and Subsequent Precipitation or Crystallisation In the present state of knowledge such phosphate recovery appears to be possible only with direct ashing of the excess sludge from increased biological P-elimination (bio-P-process). It is only on that condition that it is possible to succeed in recovering the phosphorus which is bound in the excess sludge in the form of polyphosphate after ashing of the sludge, in water-soluble form. Laboratory tests showed the applicability in principle of the method. It will be noted however that only the polyphosphate proportion which in present day conditions seldom makes up more than 40% of the raw phosphate payload can be recovered in that way. Added to that is the fact that, with stabilisation of the sewage sludges by digestion, which is usual in Germany, that involves rearrangement of the polyphosphate into a chemical-physical binding form which after ashing causes extraction with water to seem scarcely possible.

4. Elution of the Phosphates from the Ash with Sulfuric Acid

That process is offered by the Danish corporation PM Energi/BioCon A/S. In the BioCon process the phosphates are digested from the ash with sulfuric acid and eluted. Besides the phosphates iron and aluminum compounds as well as potassium are also extracted. In contrast 'non-volatile heavy metals' remain in the ash residue. Phosphorus is recovered as phosphoric acid by means of a battery of different kinds of ion exchangers. The heavy metals which are eluted at the same time occur as a specific fraction in concentrated form. The sulfate is recovered in the form of potassium hydrogen sulfate. The requirement for chemicals increases linearly with the precipitant content, for which reason the use of Fe or Al precipitants is to be reduced to the necessary minimum.

5. Krepro Process

In the Krepro process, a multi-stage process developed by Kemira Kemwater, Alpha Laval and the Helsingborg sewage treatment plant, the sewage sludge is separated into different products. In that case phosphorus is produced as iron phosphate. In the first stage the sewage sludge, after the addition of sulfuric acid, is heated at a pH-value of 1.5 and a pressure of about 4 bars to about 150° C. and hydrolysed. In that case a high proportion of the organic substance goes into solution. The undissolved proportion is then dewatered to 45% dry substance in a centrifuge and discharged. According to the description of the process the centrifugate contains the dissolved organic substances, the dissolved phosphorus, the precipitants and the redissolved heavy metals insofar as they are not bound to the sludge. After the addition of iron and stepwise increase in the pH-value to between about 8.5 and 9 iron phosphate ($FePO_4$) precipitates, which in turn is separated by centrifuging from the liquid phase, thickened to about 35% dry substance and discharged as the product. In a further step, after renewed increase in the pH-value, the heavy metals are separated off—separately from the iron phosphate. What remains behind is a centrifugate, from which the precipitant iron oxide is also recovered, before it can possibly be used as a carbon source or has to be treated in the sewage treatment plant. The process is offered in two variants, as a continuous process and as a process which is operated batch-wise. The specific heavy metal content, that is to say the heavy metal content, in relation to phosphorus, of the iron phosphate produced, is to be present only at a fraction of the value of untreated sewage sludge and of a similar order of magnitude as in the case of mineral fertilisers. Energy consumption is high. The process however manages without energy from an external source if the sewage sludge is incinerated and used for energy production. Phosphorus recovery is about 75% of the amount introduced with the sludge.

6. Seaborne Process

The Seaborne process provides for joint treatment of sewage sludge in biogas installations for manure processing. It was developed by the Seaborne Environmental Research Laboratory and is intended to use various biomasses to produce the products fertiliser and methane gas in a pure quality which can be well used. Heavy metal sulfides in concentrated form and waste water occur as by-products. In the process, biomass is digested in a fermenter depending on the respective heavy metal loading either directly or after heavy metal digestion with $H_2S$-bearing biogas. The digested biomass is dewatered in a separator. The solid is incinerated and the liquid phase is fed firstly to a heavy metal precipitation operation (RoHM=removal of heavy metals). Then the nutrients nitrogen, phosphorus and potassium are precipitated therefrom by various chemical precipitation reactions in the so-called NRS reactors (NRS=nitrogen recycling system). The $H_2S$ contained in the biogas is depleted in the RoHM reactors and used for the heavy metal precipitation process. The pre-purified biogas is freed from the $CO_2$ in the gas scrubber referred to as the RGU (regenerative gas upgrading) so that almost pure methane ($CH_4$>98%) occurs as the product. The $CO_2$ contained in the biogas is used in the form of carbonate for precipitation of the nutrients in the NRS reactors. As the incineration ash is also recycled to the fermenter again via RoHM, there is apparently no solid waste except for the heavy metal salts which can be used in the electroplating art.

7. Phostrip Process

The Phostrip process is only limitedly comparable to the above-described procedures. Admittedly in this case phosphorus is recovered from the sludge, but only in such an amount as was additionally absorbed in the increased biological P-elimination procedure ('luxury uptake'). The drawn-off excess sludge contains the same P-concentration as in the case of conventional processes so that recovery remains limited to between about 33 and 50% of the supplied sludge. The Phostrip process is to be viewed as a procedural variant in the bio-P-elimination process, in which redissolution of the phosphate is effected in the side-stream. A part of the return sludge is firstly fed to the pre-stripper and there mixed with organic substrate from the feed or the bottom discharge of the stripper in order to denitrify the nitrate contained in the sludge water under anoxic conditions. In the redissolution tank referred to as the stripper the sludge thickens under anaerobic conditions. In that case the phosphate stored in the cell is partially stripped from the biomass and discharged into the water phase. The sludge which is depleted in respect of phosphate is fed to the activation operation again and under aerobic conditions can again absorb and store phosphate. The orthophosphate-bearing supernatant is drawn off. In a precipitation reactor phosphate is precipitated with line milk or another precipitant at pH-values above 8.5 and then separated off. The process was installed in the two sewage treatment plants in Darmstadt (Germany) but stopped from time to time because of problems. It was reported that the precipitated calcium phosphate is almost free from organic impurities and $P_2O_5$ contents of between 33 and 41% are obtained in the dry material. Nonetheless for practicability reasons predominantly a sodium aluminate solution was used as the precipitant, which greatly limits the use of the phosphate. The heavy metal contents and AOX concentrations (AOX=absorbable organically bound halogens) in the precipitation sludge are to be very low (10% of the limit value of the Sewage Sludge Regulations for Cu, Zn and AOX and even lower for Cd, Cr, Hg, Ni and Pb). The process however presented problems in terms of controlling the procedure. With an inadequate residence time for the sludge in the stripper the P-redissolution was insufficient, with a sufficiently long residence time for formation of the organic acids and adequate P-redissolution, that involved severe hydrogen sulfide formation on the one hand and on the other hand damage to the sludge. In addition it is assumed there is a relationship between the proportion of thread-like micro-organisms in the activated sludge and operation of the Phostrip installation.

8. Ashdec Process

To be able to use sewage sludge ash, a process was developed in the past few years inter alia in the EU project 'SUSAN', by which the heavy metals, for example Pb, Cu, Cd, Zn and so forth are removed from the ash. The corporation Ash Dec—the name stands for 'decontamination' of ash—already has such a pilot plant in operation in Leoben, Austria. The process utilises the volatility of metal chlorides. The sewage sludge ash is mixed with environmentally compatible metal chlorides, generally $CaCl_2$, compacted to form a granular material and heated in a rotary tubular kiln above the boiling point of the heavy metal chlorides which are formed, to between 900 and 1100 degrees. In that case the metal chlorides evaporate and are separated from the gas phase by flue gas scrubbers. Two products are obtained with that process, a sewage sludge ash which is suitable as a phosphorus fertiliser and whose heavy metal content is reduced by more than 90% in relation to the original content, and as a further product, a residue with a high metal concentration which in future could also be put to economic use. In particular aluminum, iron, high-quality steel or copper can be obtained from the residue.

OBJECT OF THE INVENTION

The object of the present invention was to provide an economic process for the selective separation or recovery of reusable materials, in particular phosphorus, but possibly also metals and non-metals, from sewage sludge or sewage sludge ash.

DESCRIPTION OF THE INVENTION

The object of the invention is attained by a process for recovering reusable materials, in particular phosphate, from sewage sludge products, namely sewage sludge, sewage sludge ash or sewage sludge slag, by extraction, in which a suspension of the sewage sludge product is produced in water, alcohol, water-alcohol mixture or an aqueous solution, gaseous carbon dioxide ($CO_2$) or supercritical carbon dioxide ($scCO_2$) is introduced as an extraction agent into the suspension of the sewage sludge product, undissolved solids are separated from the liquid suspension agent, carbon dioxide is removed from the suspension agent, and reusable materials dissolved in the suspension agent are precipitated and separated from the suspension agent.

The process provides that the reusable materials such as calcium and phosphate are obtained from the systems and can be fed to a recycling exploitation procedure. The residual substances are desirably concentrated and are also fed to a further recycling exploitation procedure or are disposed of.

Large amounts of phosphate can be dissolved by suitable metering and operation with a solvent excess. For example amounts of over 30% by weight of phosphate can be dissolved when using about 5 grams of sewage sludge ash in a liter of extraction agent. As the absorption capability of the solution for phosphates is limited, it is scarcely possible to extract higher proportions of phosphate with higher levels of concentration of sewage sludge ash in extraction agent.

In a preferred embodiment of the invention the suspension agent for production of the suspension of the sewage sludge product contains one or more alcohols in an amount of between 0.1 and 50% by weight, preferably between 1 and 10% by weight, particularly preferably between 1 and 5% by weight, with respect to the amount of liquid suspension agent, wherein the one alcohol or the plurality of alcohols is/are preferably selected from methanol, ethanol and isopropanol. Particularly preferably the suspension agent is water or an aqueous solution.

In a further preferred embodiment of the invention the suspension agent for production of the suspension of the sewage sludge product further contains one or more acids in an amount of between 0.001 and 80% by weight, preferably between 0.01 and 30% by weight, particularly preferably between 0.1 and 10% by weight, with respect to the amount of liquid suspension agent, wherein the one acid or the plurality of acids is/are preferably selected from organic mono- and dicarboxylic acids and mineral acids, preferably HCl and $H_2SO_4$. The solubility of the reusable materials to be obtained, in particular calcium and phosphate, is improved by the acid addition.

In a further preferred embodiment of the invention the suspension contains the sewage sludge product in the production of the suspension in an amount of between 0.1 and 60% by weight with respect to the amount of liquid suspension agent.

In a further preferred embodiment of the invention gaseous carbon dioxide ($CO_2$) is introduced as an extraction agent into the suspension of the sewage sludge product.

In a further preferred embodiment of the invention the carbon dioxide is introduced as the extraction agent into the aqueous suspension of the sewage sludge product at a pressure of between 0.1 and 200 bars, preferably between 1 and 100 bars, particularly preferably between 5 and 10 bars. With an excessively low pressure, no amounts of phosphate worth mentioning are dissolved. It is only as from a pressure of 0.1 bar that significant amounts of the phosphate contained in the sewage sludge ash or in the sewage sludge are dissolved. At pressures over 200 bars, in comparison with lower pressures, no significantly higher amounts of phosphates are dissolved out.

In a further preferred embodiment of the invention the suspension upon introduction of the carbon dioxide as the extraction agent is at a temperature in the range of between −20 and +200° C., preferably between 0 and +100° C., particularly preferably between +20 and +50° C.

In a further preferred embodiment of the invention separation of undissolved solids from the liquid suspension agent is effected by means of filtration, sedimentation or centrifuging.

In a further preferred embodiment of the invention the removal of carbon dioxide from the suspension agent is effected by reducing the pressure and/or an increase in temperature and/or precipitation like for example with $Ca(OH)_2$ and/or ultrasonic treatment and/or microwave treatment and/or mechanical gas extraction aids.

In a further preferred embodiment of the invention the removal of carbon dioxide from the suspension agent and the precipitation and separation of reusable materials is effected fractionatedly in successive stages.

In a further preferred embodiment of the invention for precipitation of reusable materials from the suspension agent precipitation agents are additionally added, preferably alkali metal or alkaline earth compounds, preferably alkali metal or alkaline earth hydroxides, particularly preferably calcium hydroxide.

It was found that the disadvantages of the state of the art can be overcome by an extraction process with $CO_2$. In that respect the basic constituents for the extraction procedure are only a suspension agent, the water and/or alcohol, and carbon dioxide introduced in the form of gaseous or supercritical carbon dioxide. That dispenses with an energy-costly thermal process. Only the operation of drying the residues requires a higher input of energy.

With the extraction process according to the invention, it is possible to operate in a wide temperature range, temperatures of between +20 and 50° C. being particularly preferred. In that respect individual components of the sewage sludge products are dissolved by means of carbon dioxide and separated from the residue. The filtrate with the dissolved constituents is then freed of carbon dioxide in specifically targeted fashion. That is preferably effected in fractionated fashion in successive stages so that the individual fractions can be separated and passed to appropriate use. By way of example phosphate-rich fractions can be used as constituents in fertilisers. The fractions containing iron and other heavy metals can be recycled as raw material.

EXAMPLES

The sewage sludge ash used in the Examples comes from an industrial sewage sludge incineration plant which also uses communal sewage sludge.

Example 1

900 ml of water are mixed with 5 kg of sewage sludge ash, gassed with carbon dioxide in a bubble sputterer and then agitated at a pressure of 6 bars at 22° C. for 20 min. Thereafter the solid constituents are separated from the filtrate. The filtrate is then heated to 40° C. and 100 g of water are distilled off under vacuum. As soon as precipitation starts, it is filtered off. That first filter fraction still contains more than 2% of iron and 0.5% of ZnO, the remainder is predominantly $CaSO_4$. Further heating is effected until renewed precipitation occurs. That precipitation contains more than 10% of phosphorus, specified as $P_2O_5$, and over 45% of calcium, specified as CaO.

Example 2

100 l of water are placed in a pressure vessel. 0.5 kg of sewage sludge are introduced therein. Carbon dioxide is introduced into the system until a pressure of 15 bars is reached. The pressure is carefully reduced to a pressure of 4 bars. The sludge is separated by being allowed to settle and the liquid is removed under pressure. The pressure is then relieved and the remaining $CO_2$ removed from the filtrate under vacuum. The precipitate which occurs in that case is separated off and dried. In a first extraction operation 16% of the phosphorus contained in the sludge, specified as $P_2O_5$, can be obtained. Upon multiple extraction over 30% of the phosphorus contained in the sludge is obtained.

Example 3

A 10% aqueous sewage sludge suspension is produced. The suspension is mixed with $CO_2$ at 12° C. for 10 min. In that case a pressure of 30 bars is built up. The pressure is then carefully relieved and the clear supernatant is separated off. The $CO_2$ is then removed from that filtrate under vacuum so that precipitation of the dissolved substances occurs. The filter cake obtained is dried and can be used as P-bearing fertiliser.

The invention claimed is:

1. A process for recovering phosphate from sewage sludge products selected from the group consisting of: sewage sludge, sewage sludge ash, and sewage sludge slag, by extraction, comprising, in the following order, the steps of:
producing a suspension of the sewage sludge product in a liquid suspension agent comprising water, alcohol, a water-alcohol mixture or an aqueous solution,
introducing a gaseous carbon dioxide ($CO_2$) as an extraction agent into the suspension of the sewage sludge product,
separating and removing undissolved solids from the liquid suspension agent,
removing the carbon dioxide from the liquid suspension agent, and
precipitating the phosphate dissolved in the liquid suspension agent and separating and removing the precipitated phosphate from the liquid suspension agent,
wherein the step of removing the carbon dioxide from the liquid suspension agent and the step of precipitating and separating and removing the phosphate from the liquid suspension agent are part of a fractionation process, wherein each stage of the fractionation process produces a separate fraction.

2. The process of claim 1, wherein the liquid suspension agent for production of the suspension of the sewage sludge product contains one or more alcohols in an amount of between 0.1 and 50% by weight, with respect to the amount of liquid suspension agent.

3. The process of claim 1, wherein the liquid suspension agent for production of the suspension of the sewage sludge product further contains one or more acids in an amount of between 0.001 and 80% by weight, with respect to the amount of liquid suspension agent.

4. The process of claim 1, wherein when producing the suspension, the suspension contains the sewage sludge product in an amount of between 0.1 and 60% by weight with respect to the amount of liquid suspension agent.

5. The process of claim 1, wherein the gaseous carbon dioxide ($CO_2$) is introduced as the extraction agent into the aqueous suspension of the sewage sludge product at a pressure of between 0.1 and 200 bars.

6. The process of claim 1, wherein the suspension upon introduction of the gaseous carbon dioxide ($CO_2$) as the extraction agent is at a temperature in the range of between −20 and +200° C.

7. The process of claim 1, wherein separation of undissolved solids from the liquid suspension agent is effected by means of filtration, sedimentation or centrifuging.

8. The process of claim 1, wherein the removal of carbon dioxide from the liquid suspension agent is effected by a method selected from the group consisting of: (i) reducing the pressure, (ii) increasing temperature, (iii) precipitation, (iv) ultrasonic treatment, (v) microwave treatment, (vi) mechanical gas extraction aids, and (vii) combinations thereof.

9. The process of claim 1, wherein for precipitation of phosphate from the liquid suspension agent, precipitation agents are additionally added, and wherein said suspension agent precipitation agents are alkali metal or alkaline earth compounds.

10. The process of claim 2, wherein the one or more alcohols is in an amount of between 1 and 10% by weight.

11. The process of claim 2, wherein the one or more alcohols is in an amount of between 1 and 5% by weight.

12. The process of claim 3, wherein the one or more acids is in an amount of between 0.01 and 30% by weight, with respect to the amount of liquid suspension agent.

13. The process of claim 3, wherein the one or more acids is in an amount of between 0.1 and 10% by weight, with respect to the amount of liquid suspension agent.

14. The process of claim 3, wherein the liquid suspension agent for production of the suspension of the sewage sludge product further contains one or more acids in an amount of between 0.001 and 80% by weight with respect to the amount of liquid suspension agent, wherein the one acid or the plurality of acids is HCl, $H_2SO_4$, or a combination thereof.

15. The process of claim 5, wherein the pressure is between 1 and 100 bars.

16. The process of claim 5, wherein the pressure is between 5 and 10 bars.

17. The process of claim 6, wherein the temperature is in the range of between 0 and 100° C.

18. The process of claim 6, wherein the temperature is in the range of between 20 and 50° C.

19. The process of claim 9, wherein the alkaline earth compound is an alkaline earth hydroxide.

20. The process of claim 9, wherein the alkaline earth hydroxide is calcium hydroxide.

* * * * *